(12) United States Patent
Nozawa

(10) Patent No.: US 10,416,926 B2
(45) Date of Patent: Sep. 17, 2019

(54) STORAGE CONTROL METHOD AND INFORMATION PROCESSING APPARATUS

(71) Applicant: FUJITSU LIMITED, Kawasaki-shi, Kanagawa (JP)

(72) Inventor: Yasubumi Nozawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 273 days.

(21) Appl. No.: 15/480,760

(22) Filed: Apr. 6, 2017

(65) Prior Publication Data
US 2017/0337013 A1    Nov. 23, 2017

(30) Foreign Application Priority Data
May 18, 2016 (JP) .................................. 2016-099888

(51) Int. Cl.
| | | |
|---|---|---|
| *G06F 3/06* | (2006.01) | |
| *G06F 1/3287* | (2019.01) | |
| *G06F 1/3221* | (2019.01) | |

(52) U.S. Cl.
CPC .......... *G06F 3/0659* (2013.01); *G06F 1/3221* (2013.01); *G06F 1/3287* (2013.01); *G06F 3/067* (2013.01); *G06F 3/0625* (2013.01); *G06F 3/0634* (2013.01); *Y02D 10/154* (2018.01)

(58) Field of Classification Search
None
See application file for complete search history.

(56) References Cited

U.S. PATENT DOCUMENTS

| | | | | | |
|---|---|---|---|---|---|
| 4,839,640 | A | * | 6/1989 | Ozer | .................. G07C 9/00103 235/382 |
| 5,552,776 | A | * | 9/1996 | Wade | ...................... G06F 21/31 340/5.22 |
| 6,133,912 | A | * | 10/2000 | Montero | ................ G06Q 30/02 715/716 |
| 6,202,158 | B1 | * | 3/2001 | Urano | ................... G06F 21/316 726/22 |
| 8,041,672 | B2 | * | 10/2011 | Ogawa | ................ G06F 16/1734 707/609 |
| 8,171,215 | B2 | * | 5/2012 | Ikawa | ................... G06F 3/0625 711/114 |
| 8,826,143 | B2 | * | 9/2014 | Goodman | ............... H04L 67/02 715/741 |

(Continued)

FOREIGN PATENT DOCUMENTS

| | | |
|---|---|---|
| JP | 2008-112292 | 5/2008 |
| JP | 2009-80603 | 4/2009 |

*Primary Examiner* — Christopher D Birkhimer
(74) *Attorney, Agent, or Firm* — Xsensus LLP

(57) ABSTRACT

An information processing apparatus includes a memory and a processor coupled to the memory. The processor is configured to calculate, for each of first users, time lengths of accesses to data stored in a storage device on basis of start information on start times and finish information on finish times. The accesses are made by a node of each of the first users. The start times are times at which the respective accesses are started. The finish times are times at which the respective accesses are finished. The processor is configured to calculate, for each of second users among the first users, a first sum of the time lengths. The second users are in a logged-in state of being after login and before logout. The processor is configured to determine whether to power on the storage device on basis of the first sum.

6 Claims, 18 Drawing Sheets

(56) References Cited

U.S. PATENT DOCUMENTS

| | | | | |
|---|---|---|---|---|
| 8,996,487 | B1* | 3/2015 | Pasupathy | G06F 16/14 |
| | | | | 707/705 |
| 9,208,347 | B2* | 12/2015 | Alexandrian | G06F 21/629 |
| 9,240,010 | B2* | 1/2016 | Aidasani | G06Q 20/40 |
| 9,245,145 | B2* | 1/2016 | Wo | G06F 21/6218 |
| 9,275,512 | B2* | 3/2016 | Deng | G07F 17/323 |
| 9,282,090 | B2* | 3/2016 | Liberman | H04L 9/3231 |
| 9,305,163 | B2* | 4/2016 | Murphy | G06F 21/54 |
| 9,342,990 | B2* | 5/2016 | Karpoff | G09B 5/00 |
| 9,344,457 | B2* | 5/2016 | Chapman, II | G06F 21/554 |
| 9,430,637 | B2* | 8/2016 | Suzuki | G06F 21/608 |
| 2001/0012356 | A1* | 8/2001 | McDuff | H04M 3/51 |
| | | | | 379/265.02 |
| 2002/0160350 | A1* | 10/2002 | Tanaka | G09B 5/08 |
| | | | | 434/350 |
| 2002/0188565 | A1* | 12/2002 | Nakamura | G06Q 20/108 |
| | | | | 705/42 |
| 2004/0141605 | A1* | 7/2004 | Chen | H04M 3/42221 |
| | | | | 379/202.01 |
| 2005/0187934 | A1* | 8/2005 | Motsinger | H04L 63/107 |
| 2005/0188079 | A1* | 8/2005 | Motsinger | G06F 21/55 |
| | | | | 709/224 |
| 2005/0188080 | A1* | 8/2005 | Motsinger | H04L 63/1408 |
| | | | | 709/224 |
| 2005/0188221 | A1* | 8/2005 | Motsinger | G06F 21/55 |
| | | | | 726/5 |
| 2005/0188222 | A1* | 8/2005 | Motsinger | G06F 21/316 |
| | | | | 726/5 |
| 2005/0188423 | A1* | 8/2005 | Motsinger | H04L 63/0876 |
| | | | | 726/22 |
| 2005/0198099 | A1* | 9/2005 | Motsinger | G06F 21/55 |
| | | | | 709/200 |
| 2008/0104431 | A1 | 5/2008 | Shimada | |
| 2009/0083558 | A1 | 3/2009 | Sugiki et al. | |
| 2010/0186044 | A1* | 7/2010 | Yang | H04L 63/08 |
| | | | | 725/50 |
| 2010/0205370 | A1* | 8/2010 | Ikawa | G06F 3/0625 |
| | | | | 711/114 |
| 2012/0185646 | A1* | 7/2012 | Ikawa | G06F 3/0625 |
| | | | | 711/114 |
| 2013/0030927 | A1* | 1/2013 | Aidasani | G06Q 20/40 |
| | | | | 705/14.67 |
| 2013/0030936 | A1* | 1/2013 | Aidasani | G06Q 20/40 |
| | | | | 705/26.1 |
| 2014/0012733 | A1* | 1/2014 | Vidal | H04L 51/12 |
| | | | | 705/37 |
| 2014/0019488 | A1* | 1/2014 | Wo | G06F 21/6218 |
| | | | | 707/784 |
| 2015/0052594 | A1* | 2/2015 | Liberman | H04L 9/3231 |
| | | | | 726/6 |
| 2015/0052595 | A1* | 2/2015 | Murphy | G06F 21/44 |
| | | | | 726/7 |
| 2015/0113610 | A1* | 4/2015 | Zhou | G06F 21/30 |
| | | | | 726/4 |
| 2015/0120516 | A1* | 4/2015 | Smith | G06Q 40/12 |
| | | | | 705/30 |
| 2015/0121076 | A1* | 4/2015 | Wante | H04L 61/2528 |
| | | | | 713/171 |
| 2015/0128249 | A1* | 5/2015 | Alexandrian | G06F 21/629 |
| | | | | 726/16 |
| 2015/0142570 | A1* | 5/2015 | Aidasani | G06Q 20/40 |
| | | | | 705/14.57 |
| 2015/0161605 | A1* | 6/2015 | Aidasani | G06Q 20/40 |
| | | | | 705/44 |
| 2015/0373043 | A1* | 12/2015 | Wang | G06F 21/552 |
| | | | | 706/12 |
| 2016/0019549 | A1* | 1/2016 | Maizuddin | G06Q 30/016 |
| | | | | 705/7.42 |
| 2016/0023106 | A1* | 1/2016 | Mizuno | A63F 13/35 |
| | | | | 463/42 |
| 2016/0026962 | A1* | 1/2016 | Shankar | G06Q 10/06398 |
| | | | | 705/7.42 |
| 2016/0125303 | A1* | 5/2016 | Yang | G06Q 10/06398 |
| | | | | 706/52 |
| 2016/0127344 | A1* | 5/2016 | Cox | H04L 63/0823 |
| | | | | 726/7 |
| 2016/0132866 | A1* | 5/2016 | Gui | H04L 67/1097 |
| | | | | 705/35 |
| 2016/0164859 | A1* | 6/2016 | Vidal | H04L 51/12 |
| | | | | 705/37 |

\* cited by examiner

FIG. 5

| FILE | DISK |
|------|------|
| f1 | #1, #2 |
| f2 | #1 |
| f3 | #3 |
| ⋮ | ⋮ |

FIG. 6

| TIME | DISK | USER | ACCESS TYPE |
|------|------|------|-------------|
| $t_a$ | #1 | A | Open |
| $t_a$ | #2 | A | Open |
| $t_b$ | #5 | B | Close |
| ⋮ | ⋮ | ⋮ | ⋮ |

FIG. 7

| DISK | DATA SERVER |
|------|-------------|
| #0 | Sv1 |
| #1 | Sv1 |
| #2 | Sv2 |
| ⋮ | ⋮ |

FIG. 8

| FILE | OWNER | DATE AND TIME OF CREATION | DATE AND TIME OF LATEST UPDATE | FILE SIZE | ACCESS AUTHORITY |
|---|---|---|---|---|---|
| f1 | A | 2016/4/25 21:17 | 2016/4/25 21:36 | 156 | read write |
| f2 | B | 2016/4/20 03:30 | 2016/4/25 20:30 | 32 | read write |
| f3 | B | 2016/4/20 04:01 | 2016/4/25 20:58 | 32 | read write |
| ⋮ | ⋮ | ⋮ | ⋮ | ⋮ | ⋮ |

FIG. 13

| DISK #0 | DISK #1 | DISK #2 | ... |
|---|---|---|---|
| $N_{open}(u, \#0, t)$ | $N_{open}(u, \#1, t)$ | $N_{open}(u, \#2, t)$ | ... |

FIG. 14

| TIME PERIOD | DURATION OF ACCESS TO DISK #0 | DURATION OF ACCESS TO DISK #1 | ... |
|---|---|---|---|
| [t0, t1] | $S(u, \#0, t0, t1)$ | $S(u, \#1, t0, t1)$ | ... |
| [t2, t3] | $S(u, \#0, t2, t3)$ | $S(u, \#1, t2, t3)$ | ... |
| ⋮ | ⋮ | ⋮ | ... |
| [tx, ty] | $S(u, \#0, tx, ty)$ | $S(u, \#1, tx, ty)$ | ... |

| USER | DISK #0 | DISK #1 | ... |
|---|---|---|---|
| A | S(A, #0) | S(A, #1) | ... |
| B | S(B, #0) | S(B, #1) | ... |
| C | S(C, #0) | S(C, #1) | ... |
| ⋮ | ⋮ | ⋮ | ... |

| USER | LOGIN/LOGOUT | TIME |
|---|---|---|
| A | LOGGED IN | 2016/3/30 15:41:30 |
| B | LOGGED IN | 2016/3/30 17:10:24 |
| B | LOGGED OUT | 2016/3/30 17:28:56 |
| A | LOGGED OUT | 2016/3/30 19:45:19 |
| ⋮ | ⋮ | ⋮ |

STORAGE CONTROL METHOD AND INFORMATION PROCESSING APPARATUS

CROSS-REFERENCE TO RELATED APPLICATION

This application is based upon and claims the benefit of priority of the prior Japanese Patent Application No. 2016-099888, filed on May 18, 2016, the entire contents of which are incorporated herein by reference.

FIELD

The embodiment discussed herein is related to a storage control method and an information processing apparatus.

BACKGROUND

A distributed file system is a system that manages data of files and the like by using a plurality of distributed storage devices (such as hard disk drives (HDDs), for example). The power consumed by a distributed file system may be reduced by stopping the supply of power to storage devices that are not in use.

For example, the following technique exists for power saving of a system including storage devices. Requests for input or output of data with respect to a data storage are stored as an access history, and whether an access will be requested with respect to the data storage at a predetermined timing is determined based on the access history. When it is determined that an access will not be requested, the supply of power to the data storage is stopped. When it is determined that an access will be requested, power is supplied to the data storage.

The following technique also exists. The order of past access actions to a storage system's logical volumes is recorded. The supply of power to a disk with the oldest access time is stopped, and a disk predicted to be accessed next is powered on.

Here, even if a disk is stopped based on access prediction by a method described above, the prediction might be wrong and the disk might be accessed. If so, the disk has to be rebooted. In this case, it takes time before the disk becomes accessible, and the power consumption may not be reduced either.

Related techniques are disclosed in, for example, Japanese Laid-open Patent Publication No. 2009-80603 and Japanese Laid-open Patent Publication No. 2008-112292.

SUMMARY

According to an aspect of the present invention, provided is an information processing apparatus including a memory and a processor coupled to the memory. The processor is configured to calculate, for each of first users, time lengths of accesses to data stored in a storage device on basis of start information on start times and finish information on finish times. The accesses are made by a node of each of the first users. The start times are times at which the respective accesses are started. The finish times are times at which the respective accesses are finished. The processor is configured to calculate, for each of second users among the first users, a first sum of the time lengths. The second users are in a logged-in state of being after login and before logout. The processor is configured to determine whether to power on the storage device on basis of the first sum.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a file table stored in a management-data storage unit;

FIG. 6 is a diagram illustrating an example of a request history table stored in a management-data storage unit;

FIG. 7 is a diagram illustrating an example of a server table stored in a management-data storage unit;

FIG. 8 is a diagram illustrating an example of a file management table stored in a metadata storage unit;

FIG. 13 is a diagram illustrating an example of a file-count management table;

FIG. 14 is a diagram illustrating an example of a first access duration table;

FIG. 20 is a flowchart illustrating a flow of a process executed by a metadata server when a user logs in;

DESCRIPTION OF EMBODIMENT

Figure 1:
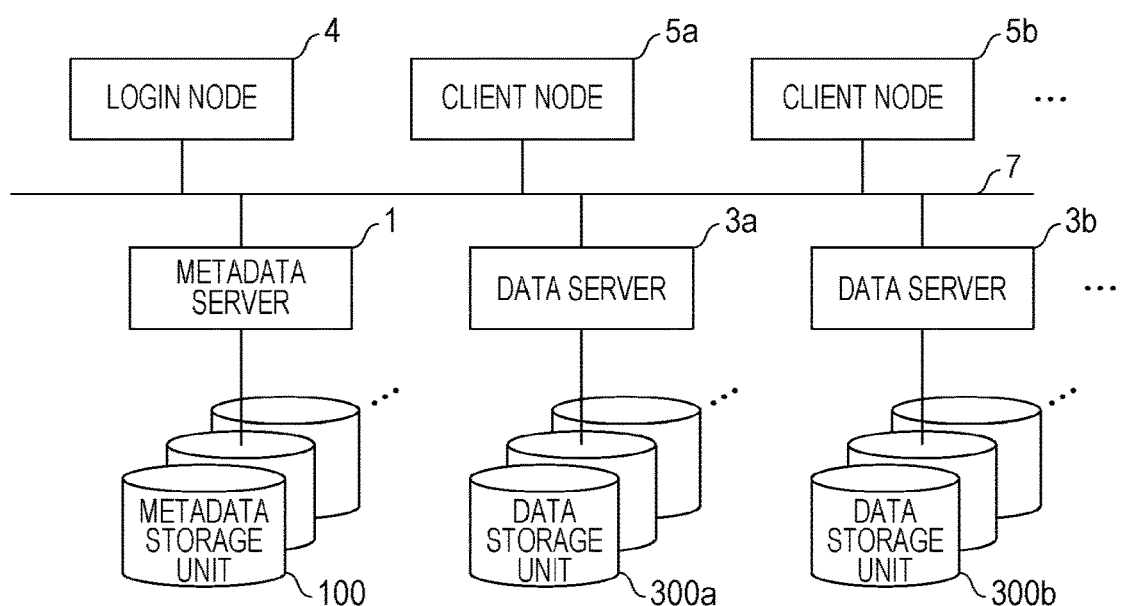
FIG. 1 is a diagram illustrating a configuration of a distributed file system according to an embodiment.

FIG. 1 illustrates a configuration of a distributed file system according to an embodiment. A metadata server 1, data servers 3a and 3b, a login node 4, and client nodes 5a and 5b are coupled to a network 7. One or more metadata storage units 100 are coupled to the metadata server 1. One or more data storage units 300a are coupled to the data server 3a, and one or more data storage units 300b are coupled to the data server 3b. The network 7 may be a local area network (LAN) or a wide area network such as the Internet.

A plurality of files in the distributed file system are stored in the data storage units 300a and 300b. Data of a single file may be stored across a plurality of data storage units. Metadata of files in the distributed file system is stored in the metadata storage units 100. The data storage units 300a and 300b are disk devices (hereinafter, referred to as disks) such as hard disk drives (HDDs), but may be other storage devices. The data storage units 300a may be incorporated in the data server 3a, and the data storage units 300b may be incorporated in the data server 3b.

The login node 4 is operated by a user and commands the client nodes 5a and 5b to execute jobs. When executing the jobs, the client nodes 5a and 5b transmit file access requests (for example, a request to write data to a file and a request to read data from a file) to the data servers 3a and 3b.

Note that the numbers of the client nodes, the data servers, the metadata storage units 100, and the data storage units 300a and 300b are not limited.

Figure 2A:
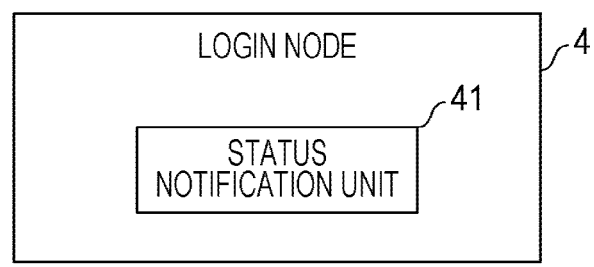
FIG. 2A is a diagram illustrating a functional configuration of a login node.

FIG. 2A illustrates a functional configuration of the login node 4. The login node 4 includes a status notification unit 41. When a user logs in (also expressed as "logs on" or "signs in"), the status notification unit 41 transmits a login notification to the metadata server 1. When a user logs out (also expressed as "logs off" or "signs out"), the status notification unit 41 transmits a logout notification to the metadata server 1.

Figure 2B:
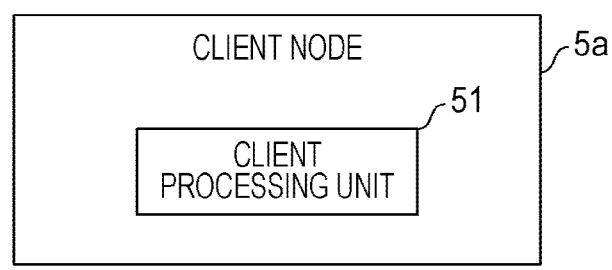
FIG. 2B is a diagram illustrating a functional configuration of a client node.

FIG. 2B illustrates a functional configuration of the client node 5a. The client node 5a includes a client processing unit 51. To access a file, the client processing unit 51 transmits a metadata access request to the metadata server 1 and transmits a file access request to the data servers 3a and 3b. Note that the functional configuration of the client node 5b is the same as the functional configuration of the client node 5a and will not therefore be described.

Figure 3:
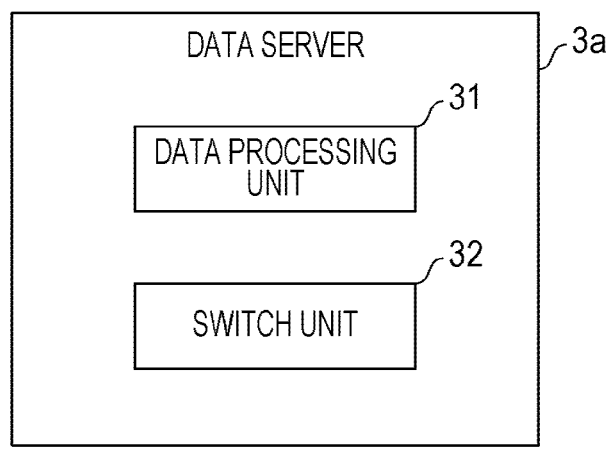
FIG. 3 is a diagram illustrating a functional configuration of a data server.

FIG. 3 illustrates a functional configuration of the data server 3a. The data server 3a includes a data processing unit 31 and a switch unit 32. The data processing unit 31 executes writing of data to files stored in the data storage units 300a, reading of data from files stored in the data storage units 300a, and so on in accordance with file access requests received from the client nodes 5a and 5b. Data read from a file is transmitted to the client node that has transmitted the request. The switch unit 32 stops or boots a disk by controlling the powering of the disk in accordance with a disk stop request or a disk boot request received from the metadata server 1. Note that the functional configuration of the data server 3b is the same as the functional configuration of the data server 3a and will not therefore be described.

Figure 4:
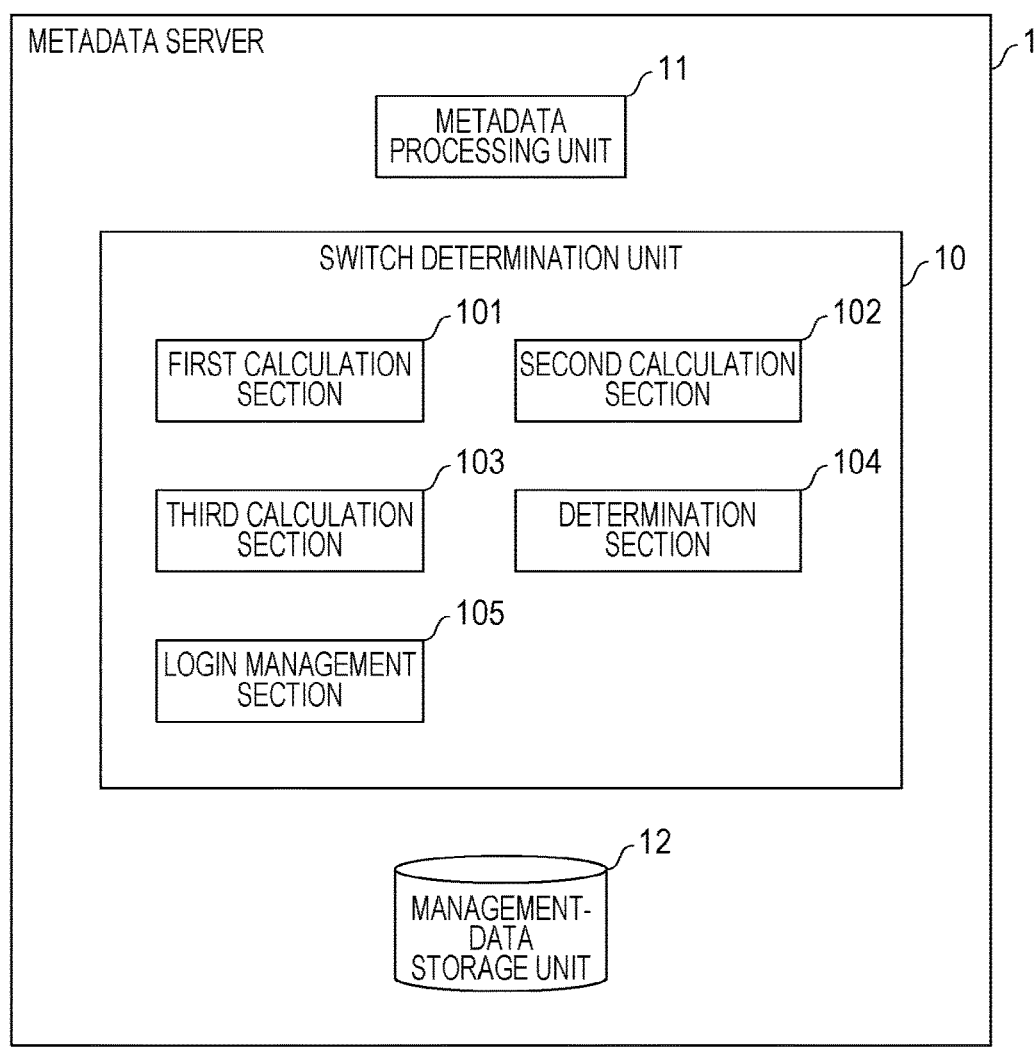
FIG. 4 is a diagram illustrating a functional configuration of a metadata server.

FIG. 4 illustrates the functional configuration of the metadata server 1. The metadata server 1 includes a switch determination unit 10, a metadata processing unit 11, and a management-data storage unit 12. The switch determination unit 10 includes a first calculation section 101, a second calculation section 102, a third calculation section 103, a determination section 104, and a login management section 105.

The metadata processing unit 11 manages metadata stored in the metadata storage units 100. Also, the metadata processing unit 11 executes rewriting of metadata stored in the metadata storage units 100, reading of metadata stored in the metadata storage units 100, and so on in accordance with a metadata access request. Metadata thus read is transmitted to a client node that has transmitted the request. Upon receiving a file open request or a file close request, the metadata processing unit 11 stores, in a request history table, time information indicating a time at which the file open request or the file close request is issued, an identifier of the user, and an identifier of the disk storing the file. The request history table is stored in the management-data storage unit 12. The disk storing the file may be identified by using a file table (FIG. 5) to be described later.

The first calculation section 101 executes a first calculation process on the basis of data stored in the management-data storage unit 12. The second calculation section 102 executes a second calculation process on the basis of data stored in the management-data storage unit 12 and the result of the process executed by the first calculation section 101. The third calculation section 103 executes a third calculation process on the basis of data stored in the management-data storage unit 12 and the result of the process executed by the second calculation section 102. The determination section 104 determines whether to switch on or off the power, on the basis of data stored in the management-data storage unit 12 and the result of the process executed by the third calculation section 103, and transmits a disk stop request or a disk boot request to a data server which manages a disk, on the basis of the result of the determination. The login management section 105 updates a login management table on the basis of a login notification or a logout notification received from the status notification unit 41.

FIG. 5 illustrates an example of the file table stored in the management-data storage unit 12. In the example of FIG. 5, each entry of the file table includes an identifier of a file and an identifier of a disk storing the file. In a case where a file is stored across a plurality of disks, identifiers of the disks are included.

FIG. 6 illustrates an example of the request history table, which is stored in the management-data storage unit 12. In the example of FIG. 6, each entry of the request history table includes time information, an identifier of a disk storing the requested file, an identifier of the user operating a client node which has transmitted the request, and access type information (open or close). In a case where a request is issued for a file stored across a plurality of disks, an entry is generated for each of the disks.

FIG. 7 illustrates an example of a server table stored in the management-data storage unit 12. In the example of FIG. 7, each entry of the server table includes an identifier of a disk and an identifier of a data server managing the disk.

FIG. 8 illustrates an example of a file management table stored in the metadata storage units 100. In the example of FIG. 8, each entry of the file management table includes an identifier of a file, an identifier of the user (owner) possessing the file, the date and time of creating the file, the date and time of the latest update of the file, the size of the file, and information on access authority.

Next, processes executed in the distributed file system according to the embodiment will be described with reference to FIGS. 9 to 24.

First, processes executed by the metadata server 1 will be described with reference to FIGS. 9 to 17B. The determination section 104 in the metadata server 1 determines whether a predetermined period of time (several minutes, for example) elapses since the latest execution of S3 to S15 (S1).

When the predetermined period of time does not elapse (S1: No), the determination section 104 returns to S1. When the predetermined period of time elapses (S1: Yes), the determination section 104 calls the first calculation section 101. In response to this call, the first calculation section 101 executes the first calculation process (S3). The first calculation process will now be described with reference to FIGS. 10 to 14.

First, the first calculation section 101 selects one unprocessed user (S21). The user selected in S21 is defined as "user u".

The first calculation section 101 selects one unprocessed disk for the user u (S23). The disk selected in S23 is defined as "disk d".

The first calculation section 101 selects one unprocessed calculation-target time period for the user u and the disk d (S25). The calculation-target time period identified in S25 is defined as [t(x-1), tx] (which is a time period from a time t(x-1) to a time tx).

Figure 11:
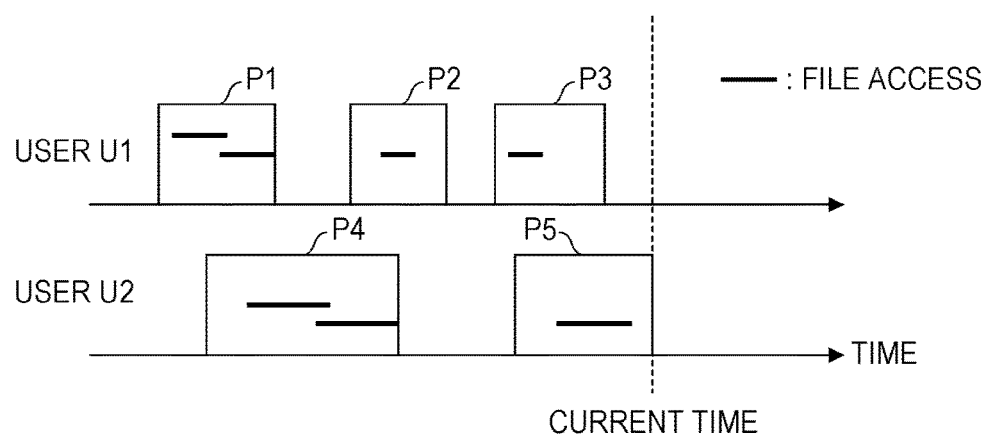
FIG. 11 is a diagram illustrating calculation-target time periods.

According to the present embodiment, a time period in which the user u is in a logged-in state of being after login and before logout (that is, the user u has logged in and not yet logged out) or there is an unclosed file (that is, an open file) belonging to the user u is regarded as a calculation-target time period, and an access duration of the user u is calculated for each calculation-target time period. Calculation-target time periods differ by users, as illustrated in FIG. 11, for example. In FIG. 11, the horizontal axis represents time. P1, P2, and P3 are calculation-target time periods of a user U1 while P4 and P5 are calculation-target time periods of a user U2. In FIG. 11, each of the bold solid lines in the calculation-target time periods represents a file access, and bold solid lines at different vertical positions represent accesses to different files.

Note that the calculation-target time period identified as "unprocessed" in S25 is a calculation-target time period that does not exist during the latest execution of the first calculation process.

For the user u, the disk d, and the calculation-target time period [t(x-1), tx], the first calculation section 101 calculates an access duration S(u, d, t(x-1), tx) and stores the calculated access duration S(u, d, t(t−1), tx) in an access duration table provided in the management-data storage unit 12 (S27). The access duration S(u, d, t(x-1), tx) represents a total time length of accesses by the user u to the disk d from the time t(x-1) to the time tx.

Figure 12:
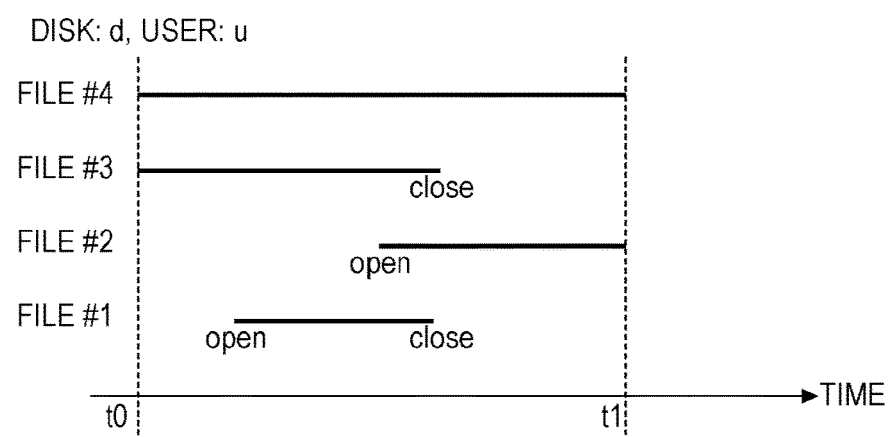
FIG. 12 is a diagram illustrating an example of an access to a plurality of files.

Assume, for example, that files are accessed as illustrated in FIG. 12 during a calculation-target time period [t0, t1] for the user u and the disk d. In this case, the access duration S(u, d, t0, t1) is equal to a sum of a time length from opening to closing of a file #1, a time length from opening of a file #2 to the time t1, a time length from the time t0 to closing of a file #3, and a time length from the time t0 to the time t1. Such a sum is calculated from the following formula.

$$S(u, d, t0, t1) = N_{open}(u, d, t0) * (t1 - t0) + \sum_{e_o}(t1 - t(e_o)) - \sum_{e_c}(t1 - t(e_c))$$

Here, $N_{open}(u, d, t)$ represents the number of files that are open and yet to be closed at a time t for the user u and the disk d, and $e_o$ and $e_c$ represent entries of the request history table (FIG. 6).

$e_o$ satisfies the following condition.

$$a(e_o)=\text{open} \land t0 \leq t(e_o) < t1 \land u(e_o)=u \land d(e_o)=d$$

$e_c$ satisfies the following condition.

$$a(e_c)=\text{close} \land t0 \leq t(e_c) < t1 \land u(e_c)=u \land d(e_c)=d$$

$t(e_o)$ represents the time of $e_o$, $a(e_o)$ represents the access type of $e_o$, $u(e_o)$ represents the user of $e_o$, and $d(e_o)$ represents the disk of $e_o$. $t(e_c)$ represents the time of $e_c$, $a(e_c)$ represents the access type of $e_c$, $u(e_c)$ represents the user of $e_c$, and $d(e_c)$ represents the disk of $e_c$.

As for $N_{open}(u, d, t)$, the following relation holds between $N_{open}(u, d, t1)$ at the present time t1 and $N_{open}(u, d, t0)$ at the past time t0.

$$N_{open}(u, d, t1) = N_{open}(u, d, t0) + \sum_{e_o} 1 - \sum_{e_c} 1 \qquad (4)$$

The second term in the right-hand side of mathematical formula (4) represents the number of times the client node of the user u opens files in the disk d during a time period from the time t0 to the time t1. The third term in the right-hand side of mathematical formula (4) represents the number of times the client node of the user u closes files in the disk d during the time period from the time t0 to the time t1. At a time tm when no file is mounted on any of the client nodes, $N_{open}(u, d, tm)=0$ holds for any user u and disk d. By using this and mathematical formula (4), $N_{open}(u, d, t)$ at an arbitrary time t may be recursively calculated.

As illustrated in FIG. 13, for each user, the first calculation section 101 stores $N_{open}(u, d, t)$ calculated lastly in a file-count management table which is provided in the management-data storage unit 12. The file-count management table is used in the next execution of S27.

The first calculation section 101 determines whether there is any unprocessed calculation-target time period for the user u and the disk d (S29). When there is an unprocessed calculation-target time period for the user u and the disk d (S29: Yes), the first calculation section 101 returns to S25 to process the next calculation-target time period.

When there is no more unprocessed calculation-target time period for the user u and the disk d (S29: No), the first calculation section 101 determines whether there is any unprocessed disk for the user u (S31). When there is an unprocessed disk for the user u (S31: Yes), the first calculation section 101 returns to S23 to process the next disk.

When there is no more unprocessed disk for the user u (S31: No), the first calculation section 101 determines whether there is any unprocessed user (S33). When there is an unprocessed user (S33: Yes), the first calculation section 101 returns to S21 to process the next user.

When there is no more unprocessed user (S33: No), the first calculation section 101 terminates the first calculation process and returns to the process from which the first calculation process has been called.

By executing the process described above, a first access duration table as illustrated in FIG. 14 is generated for the user u, for example. In FIG. 14, the first access duration table stores therein an access duration for each disk within each calculation-target time period. The first access duration table as illustrated in FIG. 14 is generated for each user and saved in the management-data storage unit 12. When, for example, the access duration S(u, d, t0, t1) is calculated for [t0, t1], the entries for [t0, t1] in the request history table (FIG. 6) are deleted to save the memory resource.

Figure 9:
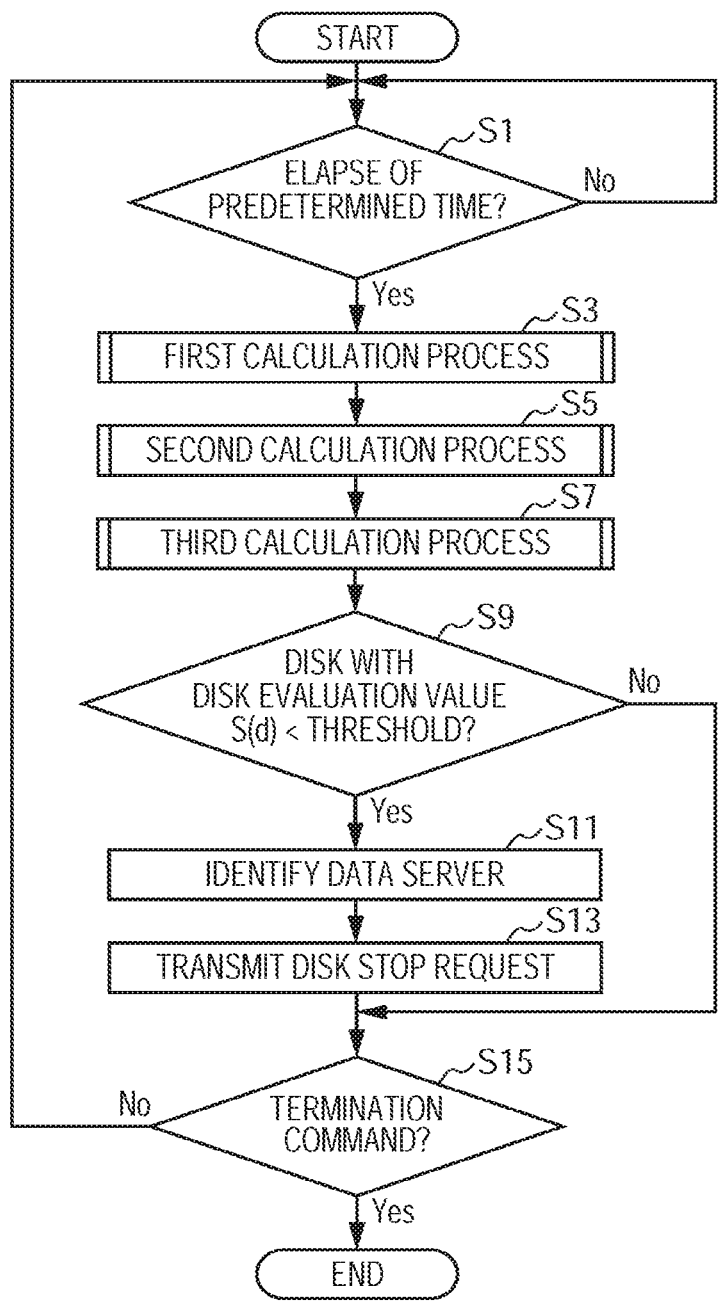
FIG. 9 is a flowchart illustrating a flow of a process executed by a metadata server.
Figure 10:
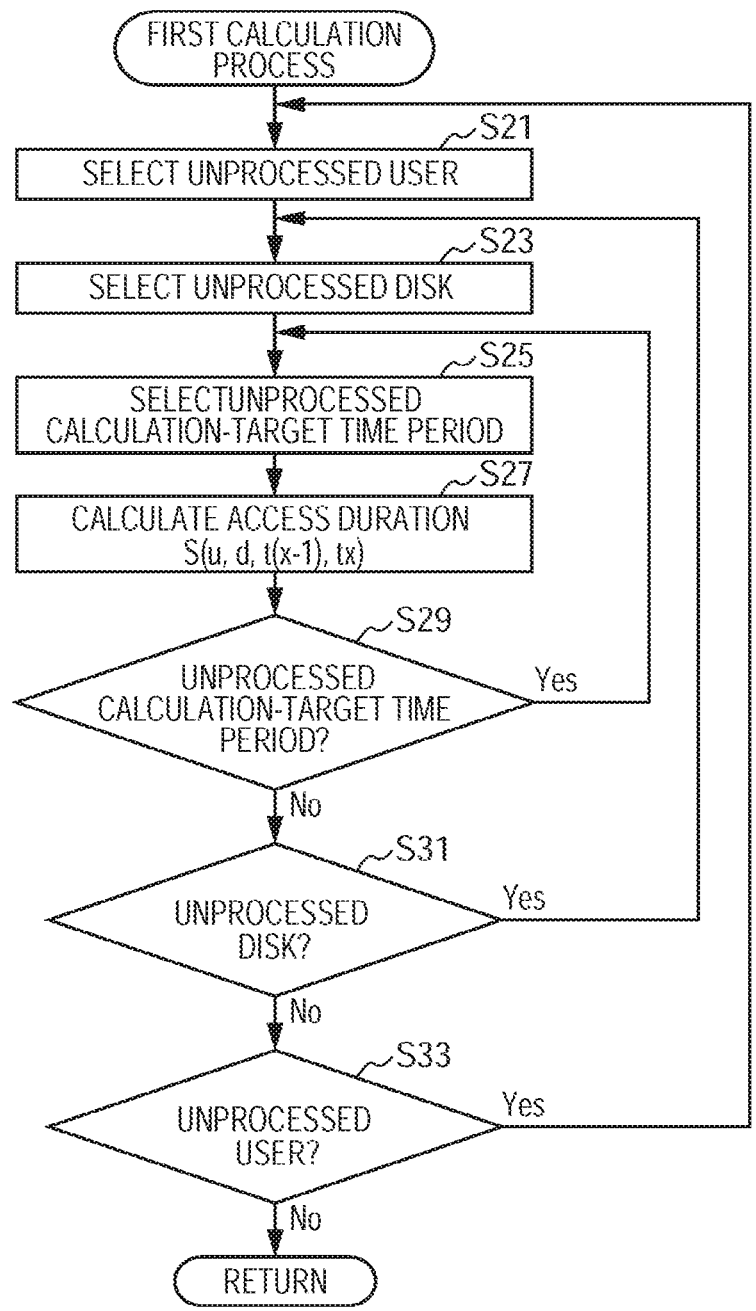
FIG. 10 is a flowchart illustrating a flow of a first calculation process.

Returning to the description with reference to FIG. 9, the determination section 104 calls the second calculation section 102. In response to this call, the second calculation section 102 executes the second calculation process (S5). The second calculation process will now be described with reference to FIGS. 15 and 16.

First, the second calculation section 102 selects one unprocessed user (S41). The user selected in S41 is defined as "user u".

The second calculation section 102 selects one unprocessed disk for the user u (S43). The disk selected in S43 is defined as "disk d".

The second calculation section 102 calculates an access duration S(u, d) of the user u to the disk d by summing the access durations S(u, d, t(x-1), tx) in a plurality of calculation-target time periods (S45). The plurality of calculation-target time periods are used in reverse chronological order for the sum calculation. As illustrated in FIG. 11, the length of a calculation-target time period differs by users. For fairness, the calculation is performed such that the total time length of the plurality of calculation-target time periods will be the same length T among all users. In doing so, for some users, only a part of the oldest calculation-target time period may be used in the sum calculation. In the case where the total time length of the plurality of calculation-target time periods is less than T, the sum calculation is performed only with the plurality of calculation-target time periods that are present. The access duration S(u, d) represents a duration of an access by the user u to the disk d within a time period having a length of T (not necessarily a continuous time period).

In the actual calculation of S(u, d), in order to increase the calculation speed, S(u, d, t(x-1), tx) not calculated in the latest or preceding processing is added to S(u, d) calculated in the latest processing, and the access duration in the oldest calculation-target time period corresponding to a time length by which the total time length exceeds T is subtracted.

The second calculation section 102 determines whether there is any unprocessed disk for the user u (S47). When there is an unprocessed disk for the user u (S47: Yes), the second calculation section 102 returns to S43.

When there is no more unprocessed disk for the user u (S47: No), the second calculation section 102 determines whether there is any unprocessed user (S49). When there is an unprocessed user (S49: Yes), the second calculation section 102 returns to S41. When there is no more unprocessed user (S49: No), the second calculation section 102 terminates the second calculation process and returns to the process from which the second calculation process has been called.

Figures 15, 16:
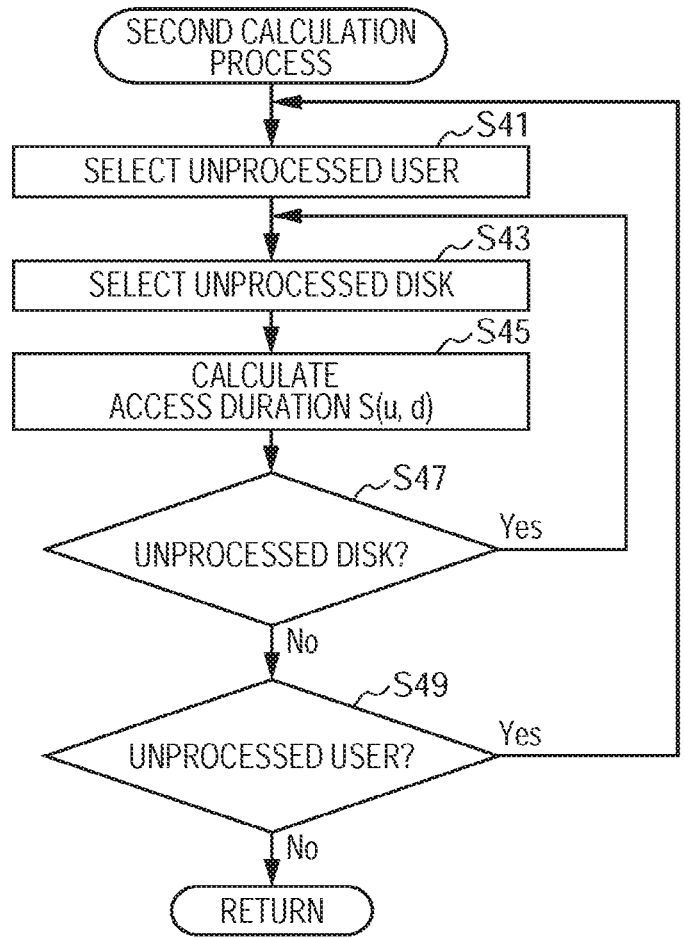
FIG. 15 is a flowchart illustrating a flow of a second calculation process.
FIG. 16 is a diagram illustrating an example of a second access duration table.
Figure 17:
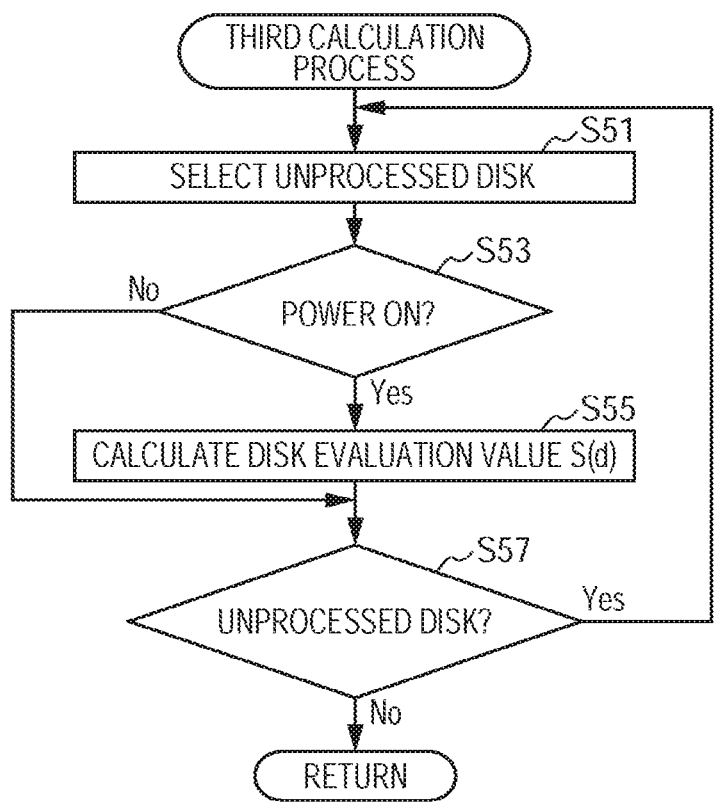
FIG. 17A is a flowchart illustrating a flow of a third calculation process.
FIG. 17B is a diagram illustrating an example of data for managing a power status of disks.

By executing the process described above, a second access duration table as illustrated in FIG. 16 is generated in the management-data storage unit 12, for example. In the example of FIG. 16, the access duration is calculated for each disk with respect to each user.

Returning to the description of FIG. 9, the determination section 104 calls the third calculation section 103. In response to this call, the third calculation section 103 executes the third calculation process (S7). The third calculation process will now be described with reference to FIGS. 17A and 17B.

First, the third calculation section 103 selects one unprocessed disk (S51). The disk selected in S51 is defined as "disk d".

The third calculation section 103 determines whether the disk d is powered on (S53). The determination in S53 is made based on data as illustrated in FIG. 17B, which is managed in the management-data storage unit 12 by the metadata server 1. However, the determination may be made alternatively by identifying a data server managing the disk d on the basis of the server table (FIG. 7) and outputting an inquiry to the identified data server.

When the disk d is not powered on (S53: No), the third calculation section 103 proceeds to S57. When the disk d is powered on (S53: Yes), the third calculation section 103 calculates a disk evaluation value S(d) by summing S(u, d) for users u which are users (logged-in users) in the state of logged-in or users with unclosed files (S55). The logged-in users are identified based on the login management table, which is generated by a process to be described later. Users who have issued a file open request but have not issued a file close request are identified as the users with unclosed files, based on the request history table (FIG. 6).

The third calculation section 103 determines whether there is any unprocessed disk (S57). When there is an unprocessed disk (S57: Yes), the third calculation section 103 returns to S51. When there is no more unprocessed disk (S57: No), the third calculation section 103 terminates the third calculation process and returns to the process from which the third calculation process has been called.

By executing the process described above, the disk evaluation value S(d), which indicates the likelihood of accesses, may be calculated for disks that are actually powered on.

Returning to the description of FIG. 9, the determination section 104 determines whether there is a disk with a disk evaluation value S(d), which is calculated in S7, less than a threshold (S9). When there is no disk with a disk evaluation value S(d) less than the threshold (S9: No), the determination section 104 proceeds to S15.

When there is a disk with a disk evaluation value S(d) less than the threshold (S9: Yes), the determination section 104 identifies a data server managing the disk with the disk evaluation value S(d) less than the threshold on the basis of the server table (FIG. 7) (S11).

The determination section 104 transmits a disk stop request to the data server identified in S11 (S13). The disk stop request contains, for example, the identifier of the disk with the disk evaluation value S(d) less than the threshold. A process executed by the data server which has received the disk stop request will be described later.

The determination section 104 determines whether an input of a termination command has been received from the administrator of the metadata server 1 (S15). When the input of a termination command has not been received (S15: No), the determination section 104 returns to S1. When the input of a termination command has been received (S15: Yes), the process is terminated.

Thus, whether or not to stop a disk is determined based on its disk evaluation value S(d), which is calculated for logged-in users or users with unclosed files. This makes it possible to stop disks which are unlikely to be actually accessed, and accordingly to reduce the power consumption of the distributed file system.

Figure 18:
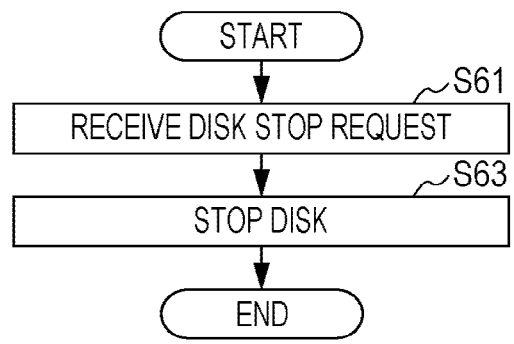
FIG. 18 is a flowchart illustrating a flow of a process executed by a data server upon receiving a disk stop request from a metadata server.

Next, a process executed by a data server which has received a disk stop request from the metadata server 1 will be described with reference to FIG. 18.

First, the switch unit 32 of a data server which receives a disk stop request from the metadata server 1 receives the disk stop request from the metadata server 1 (S61).

The switch unit 32 stops a disk indicated by the disk identifier contained in the disk stop request (that is, stops the power for that disk) (S63). The process is then terminated.

By executing the process described above, it is possible to reduce the power consumed by disks which are unlikely to be actually accessed.

Figure 19:
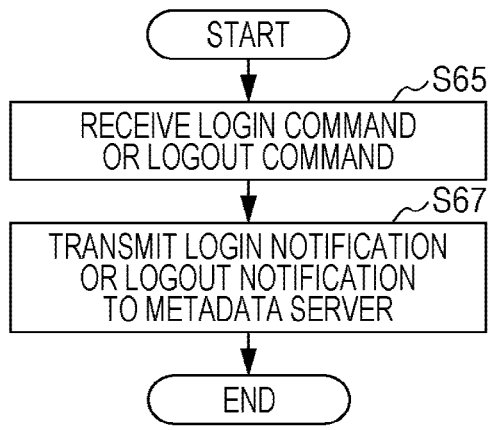
FIG. 19 is a flowchart illustrating a flow of a process executed by a login node when a user logs in or logs out.

Next, a process executed by the login node 4, which is operated by a user, when the user logs in or logs out will be described with reference to FIG. 19.

First, the status notification unit 41 of the login node 4 receives an input of a login command or a logout command from a user (S65).

The status notification unit 41 transmits a login notification indicating that the user has logged in or a logout notification indicating that the user has logged out to the metadata server 1 (S67). The process is then terminated.

By executing the process described above, the metadata server 1 may manage whether the respective users are in the logged-in state, that is, whether the respective users are logged-in users who have logged in and not yet logged out.

Figure 20:
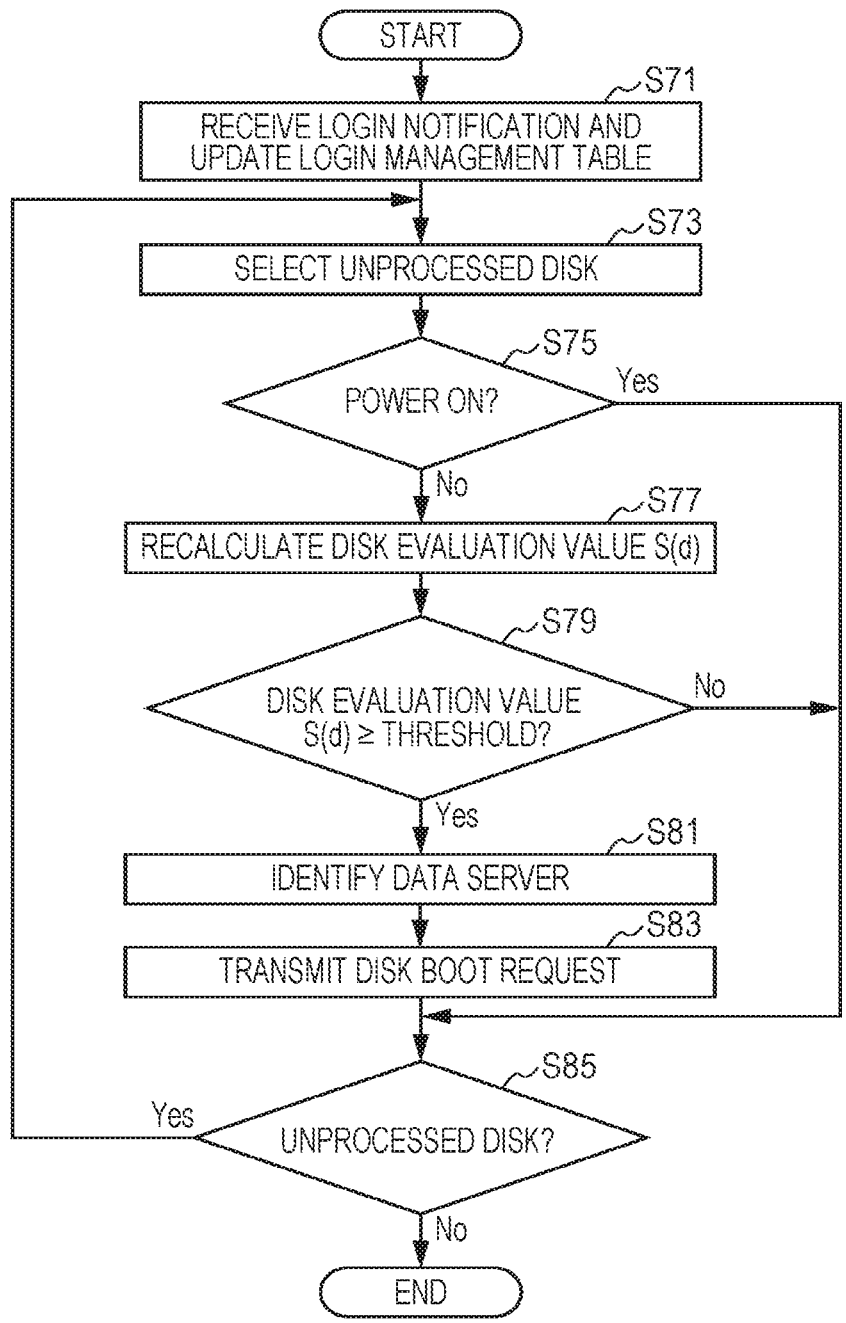

Next, a process executed by the metadata server 1 when a user logs in will be described with reference to FIG. 20.

First, the login management section 105 of the metadata server 1 receives a login notification transmitted from the login node 4, and updates the login management table, which is stored in the management-data storage unit 12, based on the received login notification (S71).

Figures 21, 22:
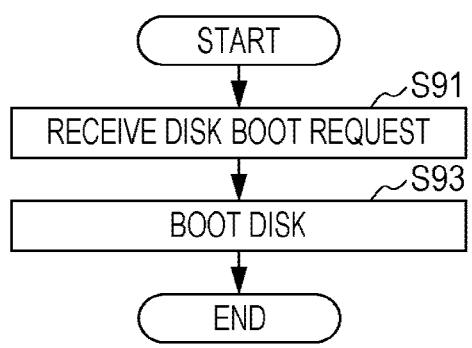
FIG. 21 is a diagram illustrating an example of data stored in a login management table.
FIG. 22 is a flowchart illustrating a flow of a process executed by a data server upon receiving a disk boot request from a metadata server.

FIG. 21 illustrates an example of data stored in the login management table. In the example of FIG. 21, each entry of the login management table includes an identifier of a user who has operated the login node 4, information indicating that the user has logged in or logged out, and time information.

The determination section 104 selects one unprocessed disk among the disks in the distributed file system (S73). The disk selected in S73 is defined as "disk d".

The determination section 104 determines whether the disk d is powered on (S75). When the disk d is powered on (S75: Yes), the determination section 104 proceeds to S85.

When the disk d is not powered on (S75: No), the determination section 104 recalculates its disk evaluation value S(d) by using S(u, d) for the newly logged-in user (that is, the user who operates the login node 4 which has transmitted the login notification) (S77). As described above, in S55, a disk evaluation value S(d) is calculated using S(u, d) for logged-in users or users with unclosed files. Thus, S(d) is recalculated by adding S(u, d) for the newly logged-in user.

The determination section 104 determines whether the disk evaluation value S(d) calculated in S77 is equal to or greater than the threshold (S79). When the disk evaluation value S(d) calculated in S77 is less than the threshold (S79: No), the disk d does not have to be booted, and the determination section 104 therefore proceeds to S85. When the disk evaluation value S(d) calculated in S77 is equal to or greater than the threshold (S79: Yes), the determination section 104 identifies the data server managing the disk d on the basis of the server table (FIG. 7) (S81).

The determination section 104 transmits a disk boot request to the data server identified in S81 (S83). The disk boot request contains, for example, an identifier of the disk with the disk evaluation value S(d) equal to or greater than the threshold.

The determination section 104 determines whether there is any unprocessed disk (S85). When there is an unprocessed disk (S85: Yes), the determination section 104 returns to S73. When there is no more unprocessed disk (S85: No), the process is terminated.

By executing the process described above, disks which are likely to be actually accessed may be kept activated. Thus, it is possible to avoid situations where, for example, stopped disks have to be booted.

Next, a process executed by a data server which has received a disk boot request from the metadata server 1 will be described with reference to FIG. 22.

First, the switch unit 32 of a data server which receives a disk boot request from the metadata server 1 receives the disk boot request from the metadata server 1 (S91).

The switch unit 32 boots a disk indicated by a disk identifier contained in the disk boot request (that is, starts the power for that disk) (S93). The process is then terminated.

By executing the process described above, disks which are likely to be actually accessed may be booted and prepare for accesses from the client nodes 5a and 5b in advance.

Figure 23:
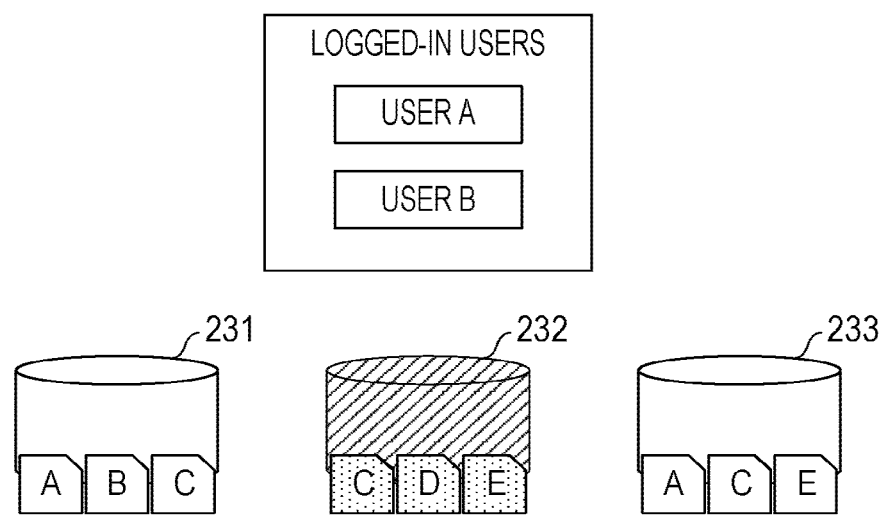
FIG. 23 is a diagram illustrating a specific example of stopping a disk.

FIG. 23 illustrates a specific example of stopping a disk. In FIG. 23, it is assumed that a user A and a user B are logged-in users. A disk 231 stores therein files frequently accessed by the user A and the user B. A disk 232 does not store therein files frequently accessed by the user A or the user B. A disk 233 stores therein a file frequently accessed by the user A.

The metadata server 1 has been notified that the user A and the user B have logged in, and regularly calculates each disk evaluation value S(d) by summing S(u, d) for the user A and S(u, d) for the user B. Then, the disk evaluation value S(d) of the disk 232 is found to be less than the threshold.

Accordingly, the disk 232 is determined to be unlikely to be accessed and is therefore stopped. Hence, power saving is achieved.

Figure 24:
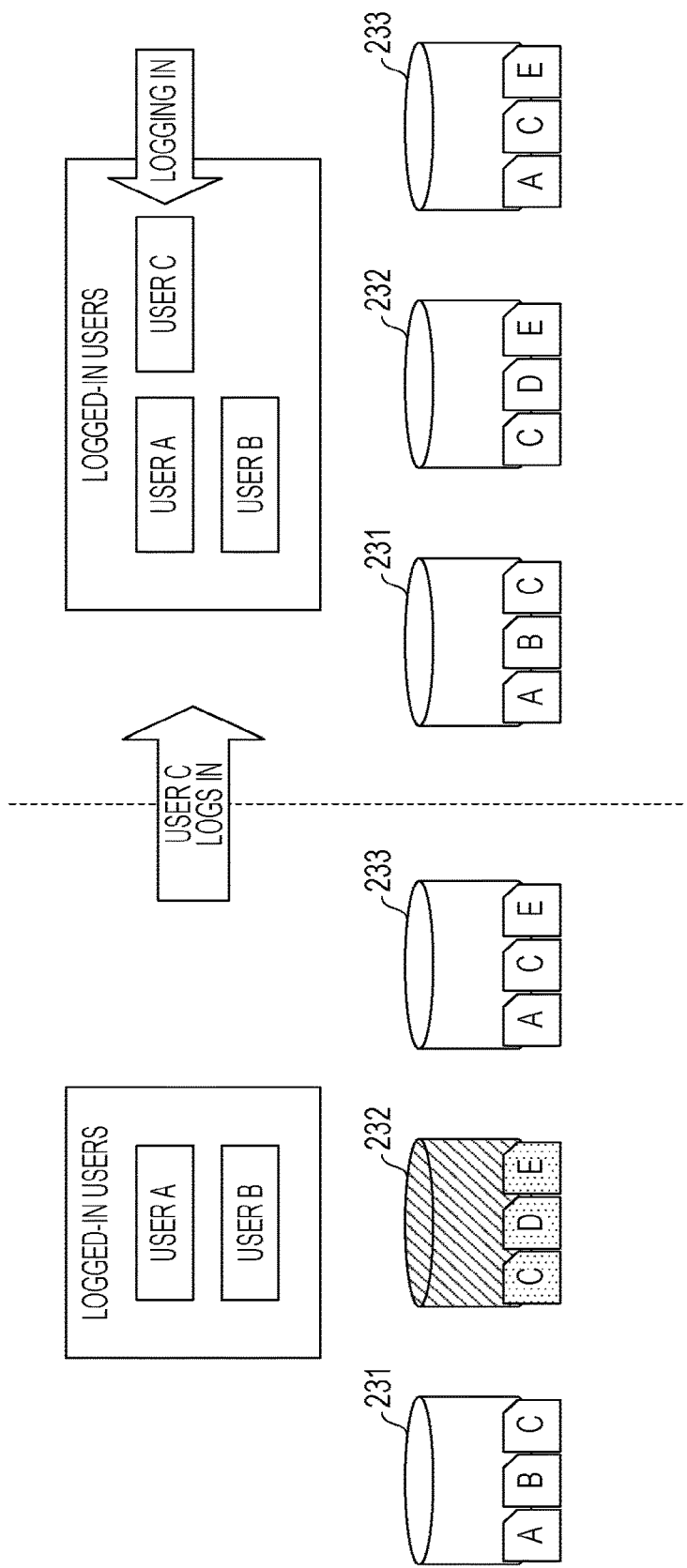
FIG. 24 is a diagram illustrating a specific example of booting a disk.

FIG. 24 illustrates a specific example of booting a disk. In FIG. 24, it is assumed that a user C newly logs in while the disk 232 is stopped. In this case, the metadata server 1 is notified that the user C has newly logged in, and thus recalculates S(d) by adding S(u, d) for the user C to S(d) which has already been calculated. Then, the disk evaluation value S(u, d) of the disk 232 reaches or exceeds the threshold. Accordingly, the disk 232 is determined to be likely to be accessed and is therefore booted. This allows a quick response to an access to the disk 232 by the user C.

Although an embodiment has been described above, the embodiment is not limiting. For example, the functional configurations of the metadata server 1, the data servers 3a and 3b, the login node 4, and the client nodes 5a and 5b described above may not match the actual program module configurations.

Also, the configuration of each table described above is an example, and does not necessarily have to be as described above. Further, the order of operations in each process flow may also be changed and the operations may be executed in parallel, as long as the process result remains unchanged.

In summing the access durations in a plurality of calculation-target time periods, the access durations in a predefined natural number N of calculation-target time periods may be calculated.

Figure 25:
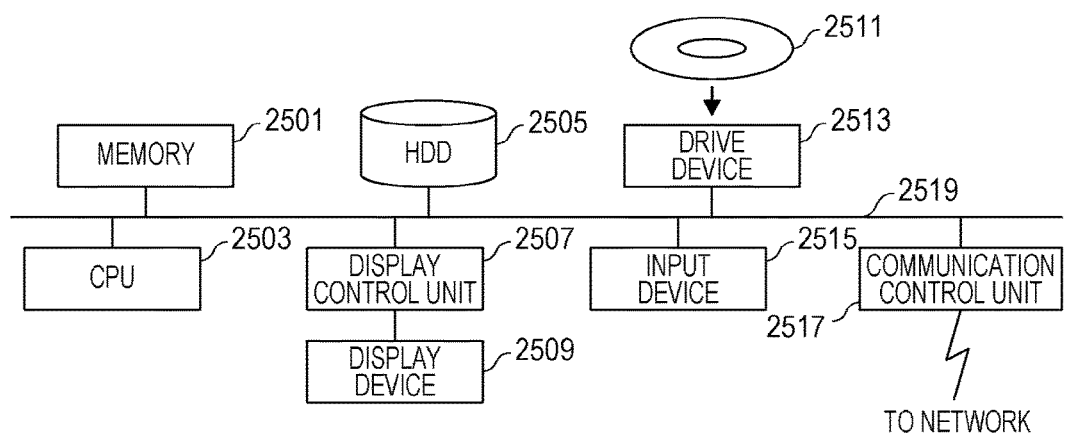
FIG. 25 is a diagram illustrating a configuration of a computer.

The above-described metadata server 1, data servers 3a and 3b, login node 4, and client nodes 5a and 5b are each a computer apparatus including, as illustrated in FIG. 25, a memory 2501, a central processing unit (CPU) 2503, an HDD 2505, a display control unit 2507 coupled to a display device 2509, a drive device 2513 for reading data from a removable disk 2511, an input device 2515, and a communication control unit 2517 for connecting to a network, which are coupled to each other via a bus 2519. An operating system (OS) and an application program for implementing the processes according to the present embodiment are stored in the HDD 2505 and are read from the HDD 2505 to the memory 2501 when executed by the CPU 2503. The CPU 2503 controls the display control unit 2507, the communication control unit 2517, and the drive device 2513 in accordance with the contents of the processes of the application program to perform predetermined operations. Data in process is mainly stored in the memory 2501 but may be stored in the HDD 2505. The application program for implementing the above-described processes may be distributed while stored in the computer-readable removable disk 2511, and is installed to the HDD 2505 via the drive device 2513. Alternatively, the application program may be installed to the HDD 2505 via a network such as the Internet and the communication control unit 2517. Such a computer apparatus implements various functions as described above with the above-described hardware such as the CPU 2503 and the memory 2501 and the above-described programs such as the OS and the application program cooperating with each other.

The embodiment described above may be summarized as follows.

An information processing apparatus according to the present embodiment includes a first calculation section, a second calculation section, and a determination section. The first calculation section calculates time lengths of accesses to data stored in a storage device by a node of each of a plurality of users on the basis of information on start times at which the respective accesses are started and information on finish times at which the respective accesses are finished. The second calculation section calculates a sum of the time lengths thus calculated for logged-in users among the plurality of users. The determination section determines whether to power on the storage device, based on the sum calculated by the second calculation section.

By executing processes described above, it is possible to avoid powering on storage devices which are unlikely to be actually accessed from logged-in users' nodes. In this way, the power consumption of a distributed data system including a plurality of storage devices may be reduced.

The data may include a plurality of files. Then, for each of the plurality of users, the first calculation section may calculate a time length of a duration of accesses to the plurality of files by the node of the user within time periods in which the user is in the logged-in state or files of the user among the plurality of files are open.

In this way, the time length reflects the likelihood of accesses during login.

Also, for each of the plurality of users, the first calculation section may calculate a sum of the time lengths of accesses to the plurality of files.

In this way, it is possible to handle cases where a plurality of files are accessed.

Also, for each of a plurality of users, the first calculation section may calculate the sum of the time lengths of accesses to the plurality of files on the basis of the length of each of the time periods in which the user is in the logged-in state or the files of the user among the plurality of files are open and the number of files which are open at the beginning of each of the time periods, the time length from the time of opening respective files which are opened during each of the time periods to the end of each of the time periods, and the time length from the time of closing respective files which are closed during each of the time periods to the end of each of the time periods.

In this way, proper calculation may be performed even in cases where a plurality of files are opened and closed at different timings.

Also, for each of the plurality of users, in a case where the total time length of the plurality of the time periods in which the user is in the logged-in state or the files of the user among the plurality of files are open exceeds a predetermined length, the first calculation section may calculate the sum of the time lengths of accesses to the plurality of files by deleting, from the total time length, the time length of accesses in the oldest time period corresponding to a time length by which the total time length exceeds the predetermined length.

In this way, the total time lengths may be the same among the users, thereby allowing more reliable reflection of the likelihood of accesses. Moreover, the processing load for calculation is reduced, thereby making it possible to suppress deterioration in access response performance.

Also, this information processing apparatus may further include a first generation section that generates information for managing logins and logouts of the plurality of users on the basis of notifications received from the login node. The notifications include a login notification indicating login of a user and a logout notification indicating logout of a user. Then, the second calculation section may identify a logged-in user on the basis of the information generated by the first generation section.

In this way, it is possible to reliably identify a logged-in node.

Also, this information processing apparatus may further include a second generation section that generates information on the time at which the node of each of the plurality of users starts an access to data and the time at which the node finishes the access, based on notifications received from the node.

A storage control method according to the present embodiment includes, calculating time lengths of accesses to data stored in a storage device by a node of each of a plurality of users on the basis of information on start times at which the respective accesses are started and information on finish times at which the respective accesses are finished, calculating a sum of the time lengths thus calculated for logged-in users among the plurality of users, and determining whether to power on the storage device, based on the calculated sum.

Note that it is possible to create a program for causing a computer to execute the processes of the above method. This program is stored in, for example, a computer-readable storage medium or storage device such as a flexible disk, a compact disc read-only memory (CD-ROM), a magneto-optical disk, a semiconductor memory, or a hard disk drive. Meanwhile, intermediate process results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and the processor configured to
calculate, for each of first users, time lengths of accesses to data stored in a storage device on basis of start information on start times and finish information on finish times, the accesses being made by a node of each of the first users, the start times being times at which the respective accesses are started, the finish times being times at which the respective accesses are finished;
calculate, for each of second users among the first users, a first sum of the time lengths, the second users being in a logged-in state of being after login and before logout; and
determine whether to power on the storage device on basis of the first sum, wherein
the data includes a plurality of files,
each of the time lengths is a time length of a duration of accesses to the plurality of files by the node of each of the first users within respective first time periods in which each of the first users is in the logged-in state or files of each of the first users among the plurality of files are open,
the length of the duration is a second sum of time lengths of the accesses to the plurality of files by the node of each of the first users,
the processor is further configured to calculate the second sum for each of the first time periods on basis of first information, second information and third information,
the first information is information on a length of each of the first time periods and a number of files which are open at a beginning of each of the first time periods,
the second information is information on a time length from a time of opening respective files which are opened during each of the first time periods to an end of each of the first time periods, and
the third information is information on a time length from a time of closing respective files which are closed during each of the first time periods to the end of each of the first time periods.

2. The information processing apparatus according to claim 1, wherein the processor is configured to reduce, in a case where a total time length of the first time periods exceeds a predetermined length, the second sum by a time length of accesses in an oldest time period corresponding to a time length by which the total time length exceeds the predetermined length.

3. The information processing apparatus according to claim 1, wherein the processor is further configured to
receive a first notification indicating any of the first users logs in,
receive a second notification indicating any of the first users logs out,
generate, on basis of the first notification and the second notification, login-state information for determining whether each of the first users is in the logged-in state, and
determine the second users on basis of the login-state information.

4. The information processing apparatus according to claim 1, wherein, the processor is further configured to receive a first notification indicating any of the first users starts an access to the data,
receive a second notification indicating any of the first users finishes the access to the data, and
generate the start information and the finish information on basis of the first notification and the second notification.

5. A method of controlling a storage device, the method comprising:
calculating by a computer, for each of first users, time lengths of accesses to data stored in the storage device on basis of start information on start times and finish information on finish times, the accesses being made by a node of each of the first users, the start times being times at which the respective accesses are started, the finish times being times at which the respective accesses are finished;
calculating, for each of second users among the first users, a first sum of the time lengths, the second users being in a logged-in state of being after login and before logout; and
determining whether to power on the storage device on basis of the first sum, wherein
the data includes a plurality of files,
each of the time lengths is a time length of a duration of accesses to the plurality of files by the node of each of the first users within respective first time periods in which each of the first users is in the logged-in state or files of each of the first users among the plurality of files are open,
the length of the duration is a second sum of time lengths of the accesses to the plurality of files by the node of each of the first users,
the method further comprises calculating the second sum for each of the first time periods on basis of first information, second information and third information,
the first information is information on a length of each of the first time periods and a number of files which are open at a beginning of each of the first time periods,
the second information is information on a time length from a time of opening respective files which are opened during each of the first time periods to an end of each of the first time periods, and
the third information is information on a time length from a time of closing respective files which are closed during each of the first time periods to the end of each of the first time periods.

6. A non-transitory computer-readable recording medium having stored therein a program that causes a computer to execute a process, the process comprising:
calculating, for each of first users, time lengths of accesses to data stored in the storage device on basis of start information on start times and finish information on finish times, the accesses being made by a node of each of the first users, the start times being times at which the respective accesses are started, the finish times being times at which the respective accesses are finished;
calculating, for each of second users among the first users, a first sum of the time lengths, the second users being in a logged-in state of being after login and before logout; and
determining whether to power on the storage device on basis of the first sum, wherein
the data includes a plurality of files,
each of the time lengths is a time length of a duration of accesses to the plurality of files by the node of each of the first users within respective first time periods in which each of the first users is in the logged-in state or files of each of the first users among the plurality of files are open, the length of the duration is a second sum of time lengths of the accesses to the plurality of files by the node of each of the first users, the process further comprises calculating the second sum for each of the first time periods on basis of first information, second information and third information, the first information is information on a length of each of the first time periods and a number of files which are open at a beginning of each of the first time periods, the second information is information on a time length from a time of opening respective files which are opened during each of the first time periods to an end of each of the first time periods, and the third information is information on a time length from a time of closing respective files which are closed during each of the first time periods to the end of each of the first time periods.

\* \* \* \* \*